(12) United States Patent
Gordon et al.

(10) Patent No.: US 11,386,052 B2
(45) Date of Patent: Jul. 12, 2022

(54) SYSTEM FOR SCANNING AND ANALYSIS OF PROTECTED ELECTRONIC DATA USING A DATABASE SCHEMA COLLECTION

(71) Applicant: Bank of America Corporation, Charlotte, NC (US)

(72) Inventors: Candace R. Gordon, Jacksonville, FL (US); Parthiban T. Shanmugam, Charlotte, NC (US); Kia Kinlaw, Charlotte, NC (US); Prashant Ranjan Srivastava, Bangalore (IN); Sriram Mohanraj, Charlotte, NC (US); Barbara Billups, Orange Park, FL (US); Timothy Lamonte Atwell, Huntersville, NC (US); Theresa Cozene Pitts, Warthen, GA (US); Kalwa Srikanth, Hyderabad (IN); Kamalanathan Jeganathan, Bangalore (IN); Todd Lowney, Jacksonville, NC (US); Bala Naga Satish Gandham, McKinney, TX (US); Kartheek Kotha, Plano, TX (US); Suman Mishra, Jersey City, NJ (US); Shakeb Mohammed Ali, Charlotte, NC (US); Archana Raghupathi, Tamil Nadu (IN)

(73) Assignee: BANK OF AMERICA CORPORATION, Charlotte, NC (US)

(*) Notice: Subject to any disclaimer, the term of this patent is extended or adjusted under 35 U.S.C. 154(b) by 262 days.

(21) Appl. No.: 16/580,344

(22) Filed: Sep. 24, 2019

(65) Prior Publication Data
US 2021/0089505 A1 Mar. 25, 2021

(51) Int. Cl.
G06F 16/21 (2019.01)
G06F 21/62 (2013.01)

(52) U.S. Cl.
CPC ........ *G06F 16/211* (2019.01); *G06F 21/6245* (2013.01)

(58) Field of Classification Search
CPC .......................... G06F 16/211; G06F 21/6245
See application file for complete search history.

(56) References Cited

U.S. PATENT DOCUMENTS

| 7,302,569 | B2 | 11/2007 | Betz et al. |
| 7,617,393 | B2 | 11/2009 | Betz et al. |
| 7,716,242 | B2 | 5/2010 | Pae et al. |
| 7,801,896 | B2 | 9/2010 | Szabo |

(Continued)

*Primary Examiner* — Alford W Kindred
*Assistant Examiner* — Tiffany Thuy Bui
(74) *Attorney, Agent, or Firm* — Moore & Van Allen PLLC; Seongun M. Hong

(57) ABSTRACT

A system provides a way to scan protected electronic data via database schema collection. In particular, the system may comprise a database schema collection application which may aggregate physical database schema from all of the databases within the network environment. The system may further comprise a protected data scan application which may receive scan results from the database schema collection (e.g., by scanning metadata) and subsequently output the scan results to other applications and/or repositories. The protected data scan application may further report changes in database schema to account for new values and/or categories existing within the various databases.

20 Claims, 3 Drawing Sheets

(56) References Cited

U.S. PATENT DOCUMENTS

| | | |
|---|---|---|
| 8,145,677 B2 | 3/2012 | Al-Shameri |
| 8,347,088 B2 | 1/2013 | Moore et al. |
| 8,498,941 B2 | 7/2013 | Felsher |
| 8,752,181 B2 | 6/2014 | Grzymala-Busse et al. |
| 8,984,650 B2 | 3/2015 | Hughes et al. |
| 9,288,184 B1 | 3/2016 | Kvamme et al. |
| 9,411,966 B1 * | 8/2016 | Smith ................. G06F 21/34 |
| 9,659,076 B2 | 5/2017 | Kumarasamy et al. |
| 9,734,169 B2 | 8/2017 | Redlich et al. |
| 9,747,169 B2 | 8/2017 | Kottomtharayil et al. |
| 9,762,603 B2 | 9/2017 | Grondin et al. |
| 9,843,596 B1 | 12/2017 | Averbuch et al. |
| 10,089,192 B2 | 10/2018 | Long et al. |
| 10,268,840 B2 * | 4/2019 | Lockhart, III ...... G06F 21/6263 |
| 10,699,028 B1 * | 6/2020 | Kennedy ............ G06F 16/2462 |
| 2003/0172368 A1 * | 9/2003 | Alumbaugh .............. G06F 8/71 717/106 |
| 2010/0250509 A1 * | 9/2010 | Andersen ............... G06Q 10/10 707/705 |
| 2014/0025641 A1 * | 1/2014 | Kumarasamy .......... G06F 16/27 707/661 |
| 2015/0172120 A1 | 6/2015 | Dwarampudi et al. |
| 2020/0097369 A1 | 3/2020 | Kilaru et al. |

\* cited by examiner

200

```
┌─────────────────────────────────────────────────────────────┐
│  SUBMIT A PROTECTED DATA SCAN REQUEST TO A DATABASE SCHEMA  │
│                    COLLECTION APPLICATION                   │
│                             201                             │
└─────────────────────────────────────────────────────────────┘
                              │
                              ▼
┌─────────────────────────────────────────────────────────────┐
│ RECEIVE, FROM THE DATABASE SCHEMA COLLECTION APPLICATION, A │
│ COMPILED LIST OF DATA FROM ONE OR MORE DATABASES COMPRISING │
│                       PROTECTED DATA                        │
│                             202                             │
└─────────────────────────────────────────────────────────────┘
                              │
                              ▼
┌─────────────────────────────────────────────────────────────┐
│ IDENTIFY, VIA A PROTECTED DATA SCAN TOOL, PROTECTED DATA    │
│       WITHIN THE COMPILED LIST OF DATABASE SCHEMA           │
│                             203                             │
└─────────────────────────────────────────────────────────────┘
                              │
                              ▼
┌─────────────────────────────────────────────────────────────┐
│ GENERATE A STORED COPY OF THE PROTECTED DATA WITHIN A       │
│                 PROTECTED DATA REPOSITORY                   │
│                             204                             │
└─────────────────────────────────────────────────────────────┘
                              │
                              ▼
┌─────────────────────────────────────────────────────────────┐
│ TRANSMIT, VIA A REPORTING APPLICATION, THE STORED COPY OF   │
│ THE PROTECTED DATA TO A USER ASSOCIATED WITH THE PROTECTED  │
│                             DATA                            │
│                             205                             │
└─────────────────────────────────────────────────────────────┘
```

FIG. 2

SYSTEM FOR SCANNING AND ANALYSIS OF PROTECTED ELECTRONIC DATA USING A DATABASE SCHEMA COLLECTION

FIELD OF THE INVENTION

The present disclosure embraces a system for scanning protected electronic data via database schema collection.

BACKGROUND

Conventional methods for processing protected electronic data may face a number of technological challenges. For example, the retrieval of protected data in conventional systems may involve the use of physical database connections and/or manually submitted queries regarding the types of protected data currently existing within the network environment. Furthermore, disparities in database platforms may present challenges in interoperability of database products. Accordingly, there is a need for an effective, platform-agnostic way to process protected electronic data.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

The present disclosure is directed to a system for scanning protected electronic data via database schema collection. In particular, the system may comprise a database schema collection application which may aggregate physical database schema from all of the databases within the network environment. The system may further comprise a protected data scan application which may receive scan results from the database schema collection (e.g., by scanning metadata) and subsequently output the scan results to other applications and/or repositories. The protected data scan application may further report changes in database schema to account for new values and/or categories existing within the various databases.

According, embodiments of the present disclosure provide a system for scanning protected electronic data via database schema collection. The system may comprise a memory device with computer-readable program code stored thereon; a communication device; and a processing device operatively coupled to the memory device and the communication device. The processing device may be configured to execute the computer-readable program code to submit a protected data scan request to a database schema collection application; receive, from the database schema collection application, a compiled list of data from one or more databases comprising protected data; identify, via a protected data scan tool, the protected data within the compiled list of database schema; generate a stored copy of the protected data within a protected data repository; and transmit, via a reporting application, the stored copy of the protected data to a user associated with the protected data.

In some embodiments, the computer-readable program code further causes the processing device to receive, via the database schema collection application, an updated list of database schema from the one or more databases comprising protected data; identify, via the protected data scan tool, an updated list of protected data within the compiled list of database schema; compare the updated list of protected data with the stored copy of the protected data; detect one or more new categories of protected data within the updated list of protected data; and store the one or more new categories of protected data in the protected data repository.

In some embodiments, identifying the protected data within the compiled list of database schema occurs without establishing a physical connection to the one or more databases.

In some embodiments, the compiled list of data from the one or more databases comprises data stored in disparate database platforms.

In some embodiments, the compiled list of data from the one or more databases comprises at least one of machine information, instance information, database name, schema name, data type, data length, column information, or database platform information.

In some embodiments, the stored copy of the protected data comprises at least one of machine name, database name, table name, column information, or protected data type.

In some embodiments, the protected data comprises personally identifiable information, the personally identifiable information comprising at least one of a name, mailing address, e-mail address, account information, date of birth, identification number, or authentication information.

Embodiments of the present disclosure also provide a computer program product for scanning protected electronic data via database schema collection. The computer program product may comprise at least one non-transitory computer readable medium having computer-readable program code portions embodied therein, the computer-readable program code portions comprising executable code portions for submitting a protected data scan request to a database schema collection application; receiving, from the database schema collection application, a compiled list of data from one or more databases comprising protected data; identifying, via a protected data scan tool, the protected data within the compiled list of database schema; generating a stored copy of the protected data within a protected data repository; and transmitting, via a reporting application, the stored copy of the protected data to a user associated with the protected data.

In some embodiments, the computer-readable program code portions further comprise executable code portions for receiving, via the database schema collection application, an updated list of database schema from the one or more databases comprising protected data; identifying, via the protected data scan tool, an updated list of protected data within the compiled list of database schema; comparing the updated list of protected data with the stored copy of the protected data; detecting one or more new categories of protected data within the updated list of protected data; and storing the one or more new categories of protected data in the protected data repository.

In some embodiments, identifying the protected data within the compiled list of database schema occurs without establishing a physical connection to the one or more databases.

In some embodiments, the compiled list of data from the one or more databases comprises data stored in disparate database platforms.

In some embodiments, the compiled list of data from the one or more databases comprises at least one of machine information, instance information, database name, schema name, data type, data length, column information, or database platform information.

In some embodiments, the stored copy of the protected data comprises at least one of machine name, database name, table name, column information, or protected data type.

Embodiments of the present disclosure also provide a computer-implemented method for scanning protected electronic data via database schema collection. The method may comprise submitting a protected data scan request to a database schema collection application; receiving, from the database schema collection application, a compiled list of data from one or more databases comprising protected data; identifying, via a protected data scan tool, the protected data within the compiled list of database schema; generating a stored copy of the protected data within a protected data repository; and transmitting, via a reporting application, the stored copy of the protected data to a user associated with the protected data.

In some embodiments, the method further comprises receiving, via the database schema collection application, an updated list of database schema from the one or more databases comprising protected data; identifying, via the protected data scan tool, an updated list of protected data within the compiled list of database schema; comparing the updated list of protected data with the stored copy of the protected data; detecting one or more new categories of protected data within the updated list of protected data; and storing the one or more new categories of protected data in the protected data repository.

In some embodiments, identifying the protected data within the compiled list of database schema occurs without establishing a physical connection to the one or more databases.

In some embodiments, the compiled list of data from the one or more databases comprises data stored in disparate database platforms.

In some embodiments, the compiled list of data from the one or more databases comprises at least one of machine information, instance information, database name, schema name, data type, data length, column information, or database platform information.

In some embodiments, the stored copy of the protected data comprises at least one of machine name, database name, table name, column information, or protected data type.

In some embodiments, the protected data comprises personally identifiable information, the personally identifiable information comprising at least one of a name, mailing address, e-mail address, account information, date of birth, identification number, or authentication information.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
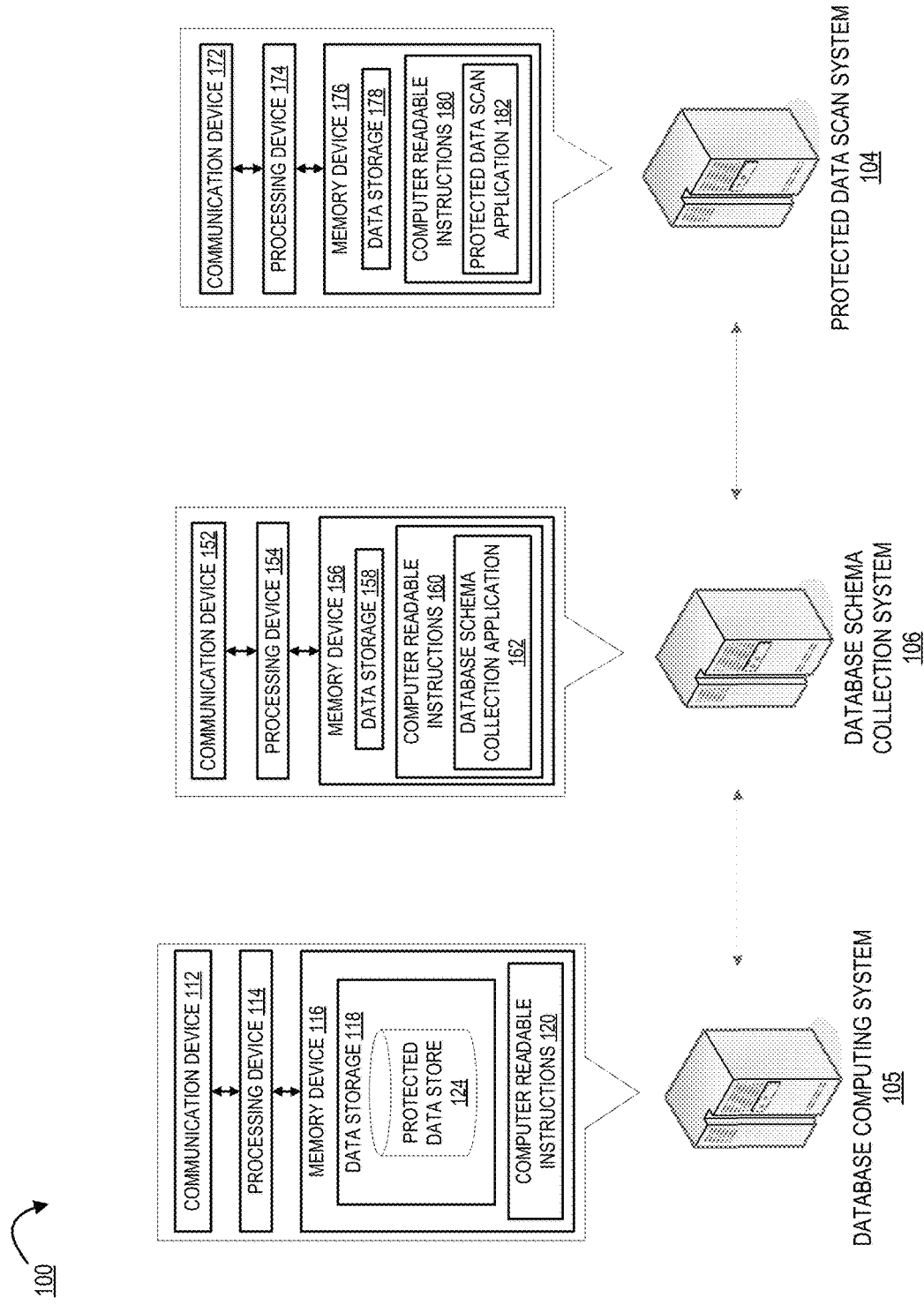
Figure 3:
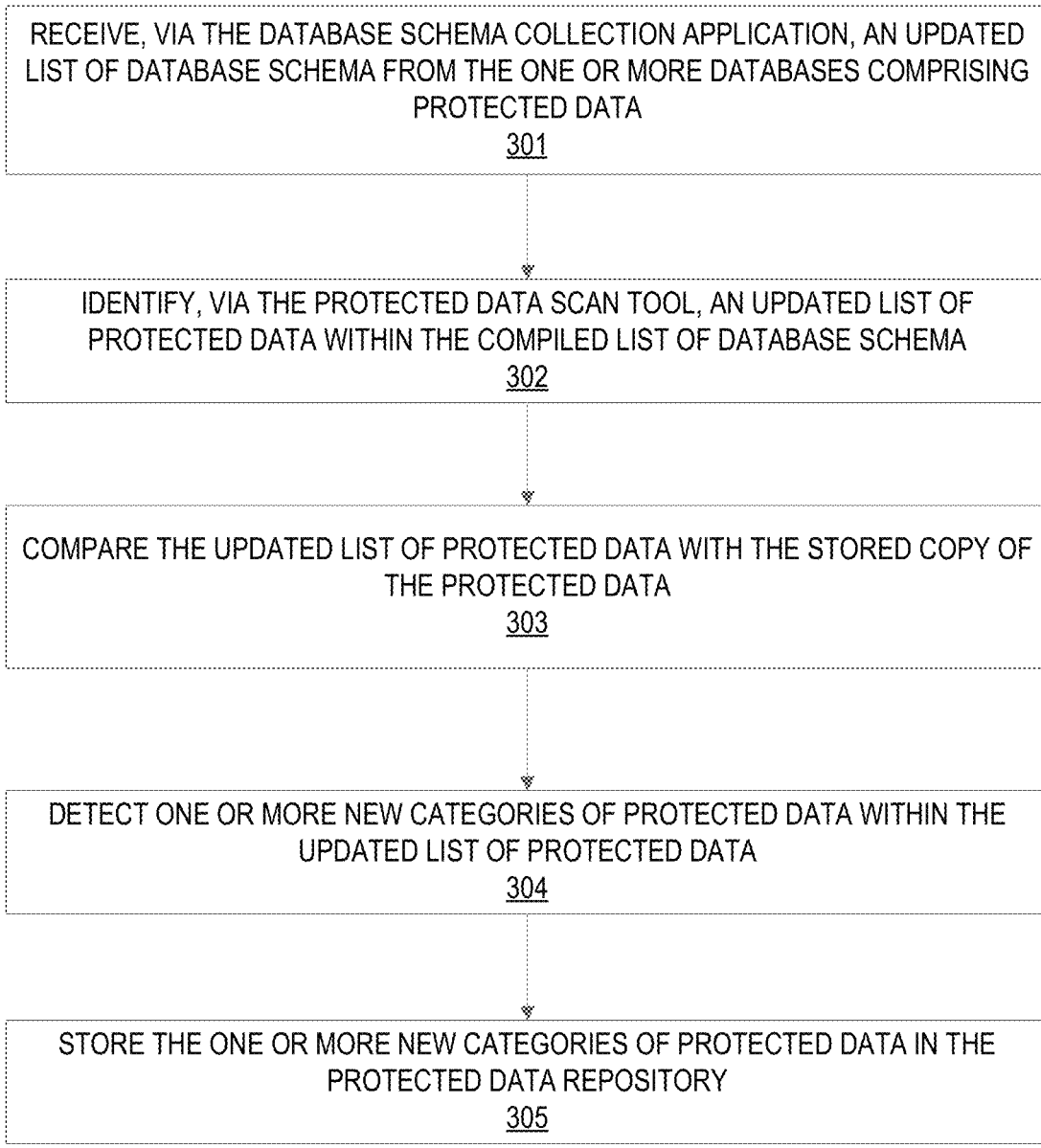

Having thus described embodiments of the invention in general terms, reference will now be made to the accompanying drawings, wherein:

FIG. 1 illustrates an operating environment for the protected data scan system, in accordance with one embodiment of the present disclosure;

FIG. 2 illustrates a process flow for the protected data scan system, in accordance with one embodiment of the present disclosure; and FIG. 3 illustrates a process flow for updating the protected data repository, in accordance with one embodiment of the present disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" as used herein may refer to an individual or an organization that owns and/or operates an online system of networked computing devices, systems, and/or peripheral devices on which the system described herein is implemented. The entity may be a business organization, a non-profit organization, a government organization, and the like, which may routinely use various types of applications within its enterprise environment to accomplish its organizational objectives.

"Entity system" as used herein may refer to the computing systems, devices, software, applications, communications hardware, and/or other resources used by the entity to perform the functions as described herein. Accordingly, the entity system may comprise desktop computers, laptop computers, servers, Internet-of-Things ("IoT") devices, networked terminals, mobile smartphones, smart devices (e.g., smart watches), network connections, and/or other types of computing systems or devices and/or peripherals along with their associated applications.

"Computing system" or "computing device" as used herein may refer to a networked computing device within the entity system. The computing system may include a processor, a non-transitory storage medium, a communications device, and a display. The computing system may be configured to support user logins and inputs from any combination of similar or disparate devices. Accordingly, the computing system may be a portable electronic device such as a smartphone, tablet, single board computer, smart device, or laptop. In other embodiments, the computing system may be a stationary unit such as a personal desktop computer, networked terminal, IoT device, or the like.

"User" as used herein may refer to an individual who may interact with the entity system to access the functions therein. Accordingly, the user may be an agent, employee, associate, contractor, or other authorized party who may access, use, administrate, maintain, and/or manage the computing systems within the entity system. In other embodiments, the user may be a client or customer of the entity.

Accordingly, as used herein the term "user device" or "mobile device" may refer to mobile phones, personal computing devices, tablet computers, wearable devices, and/or any stationary or portable electronic device capable of receiving and/or storing data therein.

"Protected data" as used herein may refer to data that is confidential, private, sensitive, subject to regulation (e.g., General Data Protection Regulation, or "GDPR"), or otherwise in need of heightened standards with respect to storage or processing of said data. Accordingly, the protected data may include Personally Identifiable Information (PII), confidential or proprietary business information, user authentication and/or authentication data, or the like.

Embodiments of the present disclosure provide a system for scanning protected electronic data via database schema collection. The system may comprise a database schema collection application which may scan all of the physical and/or logical databases within a networked environment of an entity. Upon performing the scan, the database schema collection application may generate a database schema file comprising a list of all of the database schema of the databases within the networked environment. The database schema file may include information (e.g., data and/or metadata) such as the database platform and/or product (e.g., SQL, Oracle, DB2, Azure, or the like), names of database machines and of databases hosted within the database machines, object names and types, schema name, column information (e.g., names, length, precision, scale, or the like), run date of the scan, or the like.

The system may further comprise a protected data scan application which submits a query to the database schema collection application, where the query may comprise a requested scan for protected data. In response, the data schema collection application may generate a data schema output, which may comprise at least a portion of the above information from the database schema file, and provide said output to the protected data scan application. In this regard, the protected data scan application may comprise a protected data scan tool which analyzes the data schema output to identify categories of protected data (e.g., PII) and elements from the data and/or metadata within the data schema output. Rather than establishing physical connections to the various databases within the entity system to perform the scan, the protected data scan application may instead analyze the output from the data schema collection application. Once the data schema output has been analyzed using the protected data scan tool, the protected data scan application may produce a protected data scan output to be stored in a centralized repository of protected data (or referred to herein as "protected data repository"). Examples of protected data may include information such as a name, mailing address, private documents (e.g., health, tax, or insurance documents, government records, or the like), e-mail address, account information, date of birth, identification numbers, authentication information (e.g., username, password, PIN, or the like), or the like.

The protected data scan output may comprise data and/or metadata regarding protected data found as a result of the scan, such as machine name or ID, database name, table name, column information, data types, search algorithm used to find the protected data, search criteria (e.g., taxonomy, tagging, or the like), search terms, protected statuses and/or flags (e.g., protected or not protected), or the like. In some embodiments, through the use of a protected data compare tool, the protected data scan output may further comprise a report of changes in the database schema compared to metadata stored within the protected data repository (e.g., a "delta report"). For example, after a protected data scan, the system may detect that a database contains a new column which may provide additional categorization and/or characterization of protected data (e.g., new categories of potentially protected data, such as an address for digital currency). The newly identified categories may then be appended to the protected data repository to be used in identifying said categories in future scans. In some embodiments, the protected data scan application may further feed the identified categories and/or elements to a reporting application which may aggregate and/or sort protected data according to the user or individual to which the protected data relates. In an illustrative embodiment, the reporting application may collect all of the data related to a particular user (e.g., a client of the entity) and format the data into a report which may show the user a summary of what types of information (e.g., PII) is stored within the entity's systems regarding the user.

The system as described herein confers a number of technological advantages over systems which use conventional methods of processing protected data. In particular, by aggregating database schema of all databases within the entity system (e.g., via the database schema collection application), each of which may be implemented on different platforms and/or products, the system described herein may provide a standardized, platform agnostic solution for processing protected data. Through the use of a centralized output from the database schema collection application, the system may provide an integration platform that removes the need to establish physical connections with the various databases within the entity's networks, where certain databases may be implemented on different database products from others (e.g., SQL, Oracle, or the like).

Turning now to the figures, FIG. 1 illustrates an operating environment 100 for the protected data scan system, in accordance with one embodiment of the present disclosure. In particular, FIG. 1 illustrates a database schema collection system 106 that is operatively coupled, via a network, to a protected data scan system 104 and/or a database computing system 105. In such a configuration, the database schema collection system 106 may transmit information to and receive information from the protected data scan system 104 and/or the database computing system 105. It should be understood that FIG. 1 illustrates only an exemplary embodiment of the operating environment 100, and it will be appreciated that one or more functions of the systems, devices, or servers as depicted in FIG. 1 may be combined into a single system, device, or server. For instance, at least a portion of the functions of the database schema collection system 106 and the database computing system 105 may be executed on a single computing system.

Furthermore, a single system, device, or server as depicted in FIG. 1 may represent multiple systems, devices, or servers. For instance, the database computing system 105 may represent multiple database computing systems, each of which may contain data stored in one of various database formats (e.g., SQL, Oracle, or the like), that may be communicatively coupled to the database schema collection system 106.

The network may be a system specific distributive network receiving and distributing specific network feeds and identifying specific network associated triggers. The network include one or more cellular radio towers, antennae, cell sites, base stations, telephone networks, cloud networks, radio access networks (RAN), WiFi networks, or the like. Additionally, the network may also include a global area network (GAN), such as the Internet, a wide area network (WAN), a local area network (LAN), or any other type of network or combination of networks. Accordingly, the network may provide for wireline, wireless, or a combination wireline and wireless communication between devices on the network.

As illustrated in FIG. 1, the database schema collection system 106 may comprise a communication device 152, a processing device 154, and a memory device 156. The database schema collection system 106 may be owned and/or operated by an entity such as an Internet service provider, financial institution, business organization, government agency, or the like. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 154 is operatively coupled to the communication device 152 and the memory device 156. The processing device 154 uses the communication device 152 to communicate with the network and other devices on the network, such as, but not limited to the protected data scan system 104 and/or the database computing system 105. The communication device 152 generally comprises a modem, antennae, WiFi or Ethernet adapter, radio transceiver, or other device for communicating with other devices on the network.

The memory device 156 of the database schema collection system 106 may have computer-readable instructions 160 stored thereon, which in one embodiment includes the computer-readable instructions 160 of a database schema collection application 162 which allows the entity system to perform various functions related to aggregating data and database schema, and other related functions as described herein. In some embodiments, the memory device 156 includes data storage 158 for storing data related to the system environment, but not limited to data created and/or used by the database schema collection application 162.

The database schema collection application 162 may comprise computer-executable program code which may instruct the processing device 154 to perform certain logic, data processing, and data storing functions of the application to accomplish the entity's objectives. For instance, the database schema collection application 162 may retrieve data from one or more database computing systems 105, each of which may comprise data hosted on different database platforms, and store the data in a standardized format. In this way, the database schema collection application 162 may provide for a platform-independent way of storing and managing protected data.

As further illustrated in FIG. 1, the database computing system 105 may be a computing system which is owned and/or operated by the entity for storing various types of data related to the entity's objectives. In this regard, the database computing system 105 may be, for example, a networked terminal, server, desktop computer, or the like, though it is within the scope of the disclosure for the database computing system 105 to be a portable device such as a cellular phone, smart phone, smart device, personal data assistant (PDA), laptop, or the like. The database computing system 105 generally comprises a communication device 112, a processing device 114, and a memory device 116, where the processing device 114 is operatively coupled to the communication device 112 and the memory device 116. The processing device 114 uses the communication device 112 to communicate with the network and other devices on the network, such as, but not limited to the database schema collection system 106 and/or the protected data scan system 104. As such, the communication device 112 generally comprises a modem, antennae, WiFi or Ethernet adapter, radio transceiver, or other device for communicating with other devices on the network.

The database computing system 105 comprises computer-readable instructions 120 and data storage 118 stored in the memory device 116. In some embodiments, the data storage 118 comprises a protected data store 124 comprising various types of data related to the entity's objectives. Accordingly, the protected data store 124 may contain protected data such as PII, customer data, or the like. It should be understood that while the database computing system 105 is depicted as a single unit, the operating environment 100 may comprise multiple database computing systems which host multiple data stores that may contain protected data as described herein.

The operating environment 100 may further comprise a protected data scan system 104. The protected data scan system 104 may refer to a computing system owned and/or operated by the entity which scans, processes, and/or transfers protected data (e.g., PII) within the entity system. Accordingly, the protected data scan system 104 may also comprise a processing device 174 operatively coupled to the communication device 172 and a memory device 176 comprising data storage 178 and computer readable instructions 180.

The computer readable instructions 180 may comprise a protected data scan application 182 which may be configured to instruct the processing device 174 to execute certain functions over the network, such as interacting with the database schema collection system 106 and/or the protected data scan system 104. In particular, the protected data scan application 182 may comprise a protected data scanning tool which may receive a database schema output from the database schema collection system 106 and scan the database schema output for protected data (e.g., PII). Upon identifying instances of protected data, the protected data scanning tool may output the identified protected data through one or more of several different pathways. For instance, the protected data scanning tool may output the identified protected data to a reporting application that may generate a personalized report of a user via the identified protected data. Additionally, the protected data scanning tool may output the identified protected data to a protected data compare tool. The protected data compare tool may compare the contents (e.g., the columns of data) of the received protected data with existing data records for protected data (e.g., data records which may be stored within a centralized repository of data, such as privacy data). In some embodiments, the protected data received from the protected data scan tool may contain new data records and/or categories that are not found within the existing data records. Upon detecting the existence of new data records, the protected data compare tool may generate a report regarding the detection of new data records and subsequently update the existing data within the centralized repository. In this way, the system may expand the scope of protected data to incorporate new categories of protected data in subsequent protected data scans.

The communication device 172, and other communication devices as described herein, may comprise a wireless local area network (WLAN) such as WiFi based on the Institute of Electrical and Electronics Engineers' (IEEE) 802.11 standards, Bluetooth short-wavelength UHF radio waves in the ISM band from 2.4 to 2.485 GHz or other wireless access technology. Alternatively or in addition to the wireless interface, the database computing system 105 may also include a communication interface device that may be connected by a hardwire connection to the resource distribution device. The interface device may comprise a connector such as a USB, SATA, PATA, SAS or other data connector for transmitting data to and from the respective computing system.

The computing systems described herein may each further include a processing device communicably coupled to devices as a memory device, output devices, input devices, a network interface, a power source, a clock or other timer, a camera, a positioning system device, a gyroscopic device, one or more chips, and the like.

In some embodiments, the computing systems may access one or more databases or datastores (not shown) to search for and/or retrieve information related to the service provided by the entity. The computing systems may also access a memory and/or datastore local to the various computing systems within the operating environment 100.

The processing devices as described herein may include functionality to operate one or more software programs or applications, which may be stored in the memory device. For example, a processing device may be capable of operating a connectivity program, such as a web browser application. In this way, the computing systems may transmit and receive web content, such as, for example, product valuation, service agreements, location-based content, and/or other web page content, according to a Wireless Application Protocol (WAP), Hypertext Transfer Protocol (HTTP), and/or the like.

A processing device may also be capable of operating applications. The applications may be downloaded from a server and stored in the memory device of the computing systems. Alternatively, the applications may be pre-installed and stored in a memory in a chip.

The chip may include the necessary circuitry to provide integration within the devices depicted herein. Generally, the chip will include data storage which may include data associated with the service that the computing systems may be communicably associated therewith. The chip and/or data storage may be an integrated circuit, a microprocessor, a system-on-a-chip, a microcontroller, or the like. In this way, the chip may include data storage. Of note, it will be apparent to those skilled in the art that the chip functionality may be incorporated within other elements in the devices. For instance, the functionality of the chip may be incorporated within the memory device and/or the processing device. In a particular embodiment, the functionality of the chip is incorporated in an element within the devices. Still further, the chip functionality may be included in a removable storage device such as an SD card or the like.

A processing device may be configured to use the network interface to communicate with one or more other devices on a network. In this regard, the network interface may include an antenna operatively coupled to a transmitter and a receiver (together a "transceiver"). The processing device may be configured to provide signals to and receive signals from the transmitter and receiver, respectively. The signals may include signaling information in accordance with the air interface standard of the applicable cellular system of the wireless telephone network that may be part of the network. In this regard, the computing systems may be configured to operate with one or more air interface standards, communication protocols, modulation types, and access types. By way of illustration, the devices may be configured to operate in accordance with any of a number of first, second, third, fourth, and/or fifth-generation communication protocols and/or the like. For example, the computing systems may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with fifth-generation (5G) wireless communication protocols, or the like. The devices may also be configured to operate in accordance with non-cellular communication mechanisms, such as via a wireless local area network (WLAN) or other communication/data networks.

The network interface may also include an application interface in order to allow a user or service provider to execute some or all of the above-described processes. The application interface may have access to the hardware, e.g., the transceiver, and software previously described with respect to the network interface. Furthermore, the application interface may have the ability to connect to and communicate with an external data storage on a separate system within the network.

The devices may have an interface that includes user output devices and/or input devices. The output devices may include a display (e.g., a liquid crystal display (LCD) or the like) and a speaker or other audio device, which are operatively coupled to the processing device. The input devices, which may allow the devices to receive data from a user, may include any of a number of devices allowing the devices to receive data from a user, such as a keypad, keyboard, touch-screen, touchpad, microphone, mouse, joystick, other pointer device, button, soft key, and/or other input device(s).

The devices may further include a power source. Generally, the power source is a device that supplies electrical energy to an electrical load. In some embodiment, power source may convert a form of energy such as solar energy, chemical energy, mechanical energy, or the like to electrical energy. Generally, the power source may be a battery, such as a lithium battery, a nickel-metal hydride battery, or the like, that is used for powering various circuits, e.g., the transceiver circuit, and other devices that are used to operate the devices. Alternatively, the power source may be a power adapter that can connect a power supply from a power outlet to the devices. In such embodiments, a power adapter may be classified as a power source "in" the devices.

As described above, the computing devices as shown in FIG. 1 may also include a memory device operatively coupled to the processing device. As used herein, "memory" may include any computer readable medium configured to store data, code, or other information. The memory device may include volatile memory, such as volatile Random Access Memory (RAM) including a cache area for the temporary storage of data. The memory device may also include non-volatile memory, which can be embedded and/or may be removable. The non-volatile memory may additionally or alternatively include an electrically erasable programmable read-only memory (EEPROM), flash memory or the like.

The memory device may store any of a number of applications or programs which comprise computer-executable instructions/code executed by the processing device to implement the functions of the devices described herein.

The computing systems may further comprise a gyroscopic device. The positioning system, input device, and the gyroscopic device may be used in correlation to identify phases within a service term.

Each computing system may also have a control system for controlling the physical operation of the device. The control system may comprise one or more sensors for detecting operating conditions of the various mechanical and electrical systems that comprise the computing systems or of the environment in which the computing systems are used. The sensors may communicate with the processing device to provide feedback to the operating systems of the device. The control system may also comprise metering devices for measuring performance characteristics of the computing systems. The control system may also comprise controllers such as programmable logic controllers (PLC), proportional integral derivative controllers (PID) or other machine controllers. The computing systems may also comprise various electrical, mechanical, hydraulic or other systems that perform various functions of the computing systems. These systems may comprise, for example, electrical circuits, motors, compressors, or any system that enables functioning of the computing systems.

FIG. 2 illustrates a process flow 200 for the protected data scan system, in accordance with some embodiments of the present disclosure. The process 200 begins at block 201, where the system submits a protected data scan request to a database schema collection application. The protected data scan request may include, for instance, a request for data and/or metadata regarding protected data (e.g., PII) stored within an entity's network environment. For example, in an illustrative embodiment, the entity may be a financial institution that may store various types of personal information about the entity's clients within various computing systems and/or databases within the control of the entity, where the computing systems and/or databases may store the protected data on disparate platforms (e.g., SQL, Oracle, or the like). Accordingly, the protected data scan request may be submitted by the system to determine the location of said protected data, the nature of the protected data stored, name of the host computing system, or the like. As described elsewhere herein, the database schema collection application may aggregate all of the database schema within the entity system into a standardized format. In this way, rather than physically connecting to each database or other computing system directly to scan for protected data, the system may scan the aggregated database schema via the output produced by the database schema collection application.

The process continues to block 202, where the system receives, from the database schema collection application, a compiled list of data from one or more databases comprising protected data. The compiled list of data may include a standardized list of database schema and data entries according to the database schema. Accordingly, the compiled list may include entries for the name of the host computing system, database product type (e.g., SQL, Oracle, or the like), name of the database, schema name, object name (e.g., mailing address), data description (e.g., columns corresponding to street number, street name, city, zip code, or the like), and/or data scan run time, among other types of data or metadata. In this way, the system may perform a scan for all of the protected data stored within the entity's network environment without individually establishing physical connections to the various databases and/or computing systems on which the protected data are stored.

The process continues to block 203, where the system identifies, via a protected data scan tool, protected data within the compiled list of database schema. Continuing the above example, the compiled list of data may include data entries corresponding with a client's mailing address is stored within a SQL database hosted on a machine named "DB-001." The system may identify the data entries corresponding to the client's address, among others, as protected data.

The process continues to block 204, where the system generates a stored copy of the protected data within a protected data repository. The stored copy of the protected data may further contain various types of metadata regarding the identified protected data, such as protected data status and/or type, data entry/column name, search algorithm used to find the protected data, protected data discovery criteria, or the like. Accordingly, the stored copy of the protected data may serve as a reference for all of the protected data stored within the entity's systems.

The process concludes at block 205, where the system transmits, via a reporting application, the stored copy of the protected data to a user associated with the protected data. For instance, a user (e.g., a client of the entity) may request that the entity provide a list of all personally identifiable information stored within the entity's network that pertains to the user (e.g., pursuant to a regulation such as GDPR). In such an embodiment, the reporting application may generate a personalized report from the stored copy of the protected data, where the personalized report contains a list and/or descriptions of the personal data that the entity stores and/or processes pertaining to the user. Accordingly, the report may contain such information as the nature of information collected, the manner in which the information was used, how the information is stored, or the like.

FIG. 3 illustrates a process flow 300 for updating the protected data repository, in accordance with some embodiments of the present disclosure. The process begins at block 301, where the system receives, via the database schema collection application, an updated list of database schema from the one or more databases comprising protected data. In this regard, the database schema collection application may periodically query the various databases and/or computing systems within the entity's network at a predefined frequency (e.g., hourly, daily, weekly, or the like). Accordingly, the database schema may be updated with new data and/or metadata as they are discovered within the entity network.

The process continues to block 302, where the system identifies, via the protected data scan tool, an updated list of protected data within the compiled list of database schema. In some embodiments, the protected data scan tool may receive the updated list of protected data from the database schema collection application after submitting a protected data scan request (e.g., the updated list is received on a per-scan basis). In other embodiments, the updated list may be received automatically at regular intervals.

The process continues to block 303, where the system compares the updated list of protected data with the stored copy of the protected data. The protected data scan system may, for instance, use a protected data compare tool to look for differences between the updated list of protected data with the copy of the protected data stored within the protected data repository. For instance, the updated list of protected data may contain new data entries, new data categories and/or columns, new classifications for protected data, or the like.

The process continues to block 304, where the system detects one or more new categories of protected data within the updated list of protected data. In this way, the system may account for new types of information that may become protected data in the future (e.g., as a result of changing regulations). For instance, if electronic currency addresses become classified as protected data, the new categories corresponding to electronic currency addresses may be detected by the protected data scan application as part of the protected data scan process; accordingly, rather than establishing individual physical connections to each database which may potentially include said categories, the new categories are detected automatically via the database schema collection mechanism as described elsewhere herein.

The process concludes at block 305, where the system stores the one or more new categories of protected data in the protected data repository. Once the new categories have been stored, the protected data scan application may be configured to support scanning and/or filtering according to the new categories for subsequent scans for protected data.

Each communication interface described herein generally includes hardware, and, in some instances, software, that enables the computer system, to transport, send, receive, and/or otherwise communicate information to and/or from the communication interface of one or more other systems on the network. For example, the communication interface of the user input system may include a wireless transceiver, modem, server, electrical connection, and/or other electronic device that operatively connects the user input system to another system. The wireless transceiver may include a radio circuit to enable wireless transmission and reception of information.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EEPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for scanning protected electronic data via database schema collection, the system comprising:
   a memory device with computer-readable program code stored thereon;
   a communication device; and
   a processing device operatively coupled to the memory device and the communication device, wherein the processing device is configured to execute the computer-readable program code to:
      submit a protected data scan request to a database schema collection application;
      receive, from the database schema collection application, a compiled list of data from one or more databases comprising protected data;
      identify, via a protected data scan tool, the protected data within the compiled list of database schema;
      generate a stored copy of the protected data within a protected data repository;
      transmit, via a reporting application, the stored copy of the protected data to a user associated with the protected data;
      generate, via the reporting application, a personalized report associated with the user, wherein the personalized report comprises a list and descriptions of the protected data;
      transmit the personalized report to the user;
      detect, using a protected data compare tool, a change in a database schema in the one or more databases comprises protected data;
      generate a delta report comparing the change in the database schema with metadata stored within the protected data repository, wherein the delta report comprises an indication of a new column within the change in the database schema, wherein the new column provides a new classification of protected data;
      update the protected data repository based on the delta report, wherein updating the protected data repository based on the delta report comprises appending the new column to the protected data repository;
      identify, in response to a second protected data scan request, the new classification of protected data within the second protected data scan request; and
      store the new classification of protected data in the protected data repository.

2. The system according to claim 1, wherein the computer-readable program code further causes the processing device to:
   receive, via the database schema collection application, an updated list of database schema from the one or more databases comprising protected data;
   identify, via the protected data scan tool, an updated list of protected data within the compiled list of database schema;
   compare the updated list of protected data with the stored copy of the protected data;
   detect one or more new categories of protected data within the updated list of protected data; and
   store the one or more new categories of protected data in the protected data repository.

3. The system according to claim 1, wherein identifying the protected data within the compiled list of database schema occurs without establishing a physical connection to the one or more databases.

4. The system according to claim 1, wherein the compiled list of data from the one or more databases comprises data stored in disparate database platforms.

5. The system according to claim 4, wherein the compiled list of data from the one or more databases comprises at least one of machine information, instance information, database name, schema name, data type, data length, column information, or database platform information.

6. The system according to claim 1, wherein the stored copy of the protected data comprises at least one of machine name, database name, table name, column information, or protected data type.

7. The system according to claim 1, wherein the protected data comprises personally identifiable information, the personally identifiable information comprising at least one of a name, mailing address, e-mail address, account information, date of birth, identification number, or authentication information.

8. A computer program product for scanning protected electronic data via database schema collection, the computer program product comprising at least one non-transitory computer readable medium having computer-readable program code portions embodied therein, the computer-readable program code portions comprising executable code portions for:
   submitting a protected data scan request to a database schema collection application;
   receiving, from the database schema collection application, a compiled list of data from one or more databases comprising protected data;
   identifying, via a protected data scan tool, the protected data within the compiled list of database schema;
      generating a stored copy of the protected data within a protected data repository;
   transmitting, via a reporting application, the stored copy of the protected data to a user associated with the protected data;
   generating, via the reporting application, a personalized report associated with the user, wherein the personalized report comprises a list and descriptions of the protected data;
   transmitting the personalized report to the user;
   detecting, using a protected data compare tool, a change in a database schema in the one or more databases comprises protected data;
   generating a delta report comparing the change in the database schema with metadata stored within the protected data repository, wherein the delta report comprises an indication of a new column within the change in the database schema, wherein the new column provides a new classification of protected data;

updating the protected data repository based on the delta report, wherein updating the protected data repository based on the delta report comprises appending the new column to the protected data repository;

identifying, in response to a second protected data scan request, the new classification of protected data within the second protected data scan request; and storing the new classification of protected data in the protected data repository.

9. The computer program product according to claim 8, wherein the computer-readable program code portions further comprise executable code portions for:

receiving, via the database schema collection application, an updated list of database schema from the one or more databases comprising protected data;

identifying, via the protected data scan tool, an updated list of protected data within the compiled list of database schema;

comparing the updated list of protected data with the stored copy of the protected data;

detecting one or more new categories of protected data within the updated list of protected data; and storing the one or more new categories of protected data in the protected data repository.

10. The computer program product according to claim 8, wherein identifying the protected data within the compiled list of database schema occurs without establishing a physical connection to the one or more databases.

11. The computer program product according to claim 8, wherein the compiled list of data from the one or more databases comprises data stored in disparate database platforms.

12. The computer program product according to claim 11, wherein the compiled list of data from the one or more databases comprises at least one of machine information, instance information, database name, schema name, data type, data length, column information, or database platform information.

13. The computer program product according to claim 8, wherein the stored copy of the protected data comprises at least one of machine name, database name, table name, column information, or protected data type.

14. A computer-implemented method for scanning protected electronic data via database schema collection, wherein the method comprises:

submitting a protected data scan request to a database schema collection application;

receiving, from the database schema collection application, a compiled list of data from one or more databases comprising protected data;

identifying, via a protected data scan tool, the protected data within the compiled list of database schema;

generating a stored copy of the protected data within a protected data repository; and transmitting, via a reporting application, the stored copy of the protected data to a user associated with the protected data;

generating, via the reporting application, a personalized report associated with the user, wherein the personalized report comprises a list and descriptions of the protected data;

transmitting the personalized report to the user;

detecting, using a protected data compare tool, a change in a database schema in the one or more databases comprises protected data;

generating a delta report comparing the change in the database schema with metadata stored within the protected data repository, wherein the delta report comprises an indication of a new column within the change in the database schema, wherein the new column provides a new classification of protected data;

updating the protected data repository based on the delta report, wherein updating the protected data repository based on the delta report comprises appending the new column to the protected data repository;

identifying, in response to a second protected data scan request, the new classification of protected data within the second protected data scan request; and storing the new classification of protected data in the protected data repository.

15. The computer-implemented method according to claim 14, the method further comprising:

receiving, via the database schema collection application, an updated list of database schema from the one or more databases comprising protected data;

identifying, via the protected data scan tool, an updated list of protected data within the compiled list of database schema;

comparing the updated list of protected data with the stored copy of the protected data;

detecting one or more new categories of protected data within the updated list of protected data; and storing the one or more new categories of protected data in the protected data repository.

16. The computer-implemented method according to claim 14, wherein identifying the protected data within the compiled list of database schema occurs without establishing a physical connection to the one or more databases.

17. The computer-implemented method according to claim 14, wherein the compiled list of data from the one or more databases comprises data stored in disparate database platforms.

18. The computer-implemented method according to claim 17, wherein the compiled list of data from the one or more databases comprises at least one of machine information, instance information, database name, schema name, data type, data length, column information, or database platform information.

19. The computer-implemented method according to claim 14, wherein the stored copy of the protected data comprises at least one of machine name, database name, table name, column information, or protected data type.

20. The computer-implemented method according to claim 14, wherein the protected data comprises personally identifiable information, the personally identifiable information comprising at least one of a name, mailing address, e-mail address, account information, date of birth, identification number, or authentication information.

* * * * *